No. 667,354. Patented Feb. 5, 1901.
L. P. WHITAKER.
APPARATUS FOR SEPARATING FLEXIBLE PORTIONS OF LEAVES FROM THEIR STEMS.
(Application filed Jan. 26, 1900.)
(No Model.) 4 Sheets—Sheet 4.
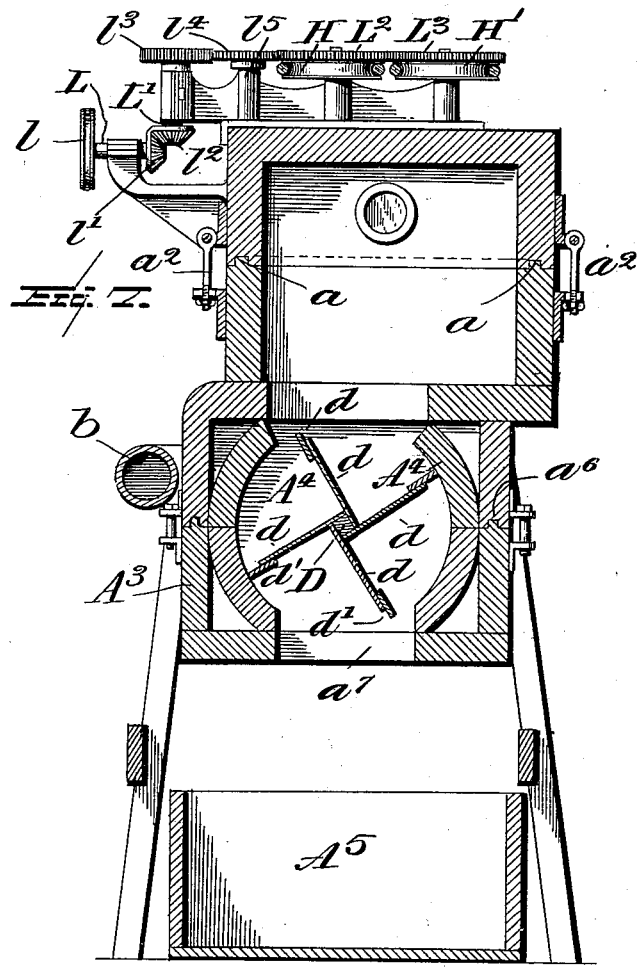
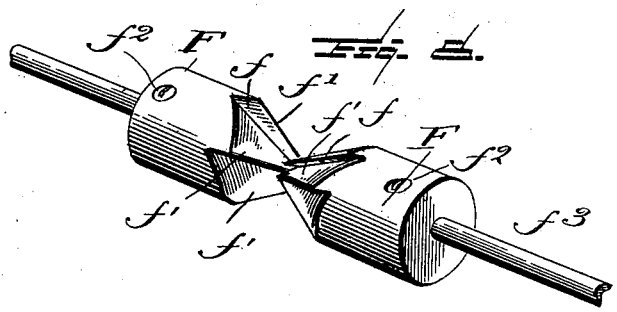
WITNESSES:
INVENTOR
Louis P. Whitaker
BY
Whitaker Prevost Attorneys.

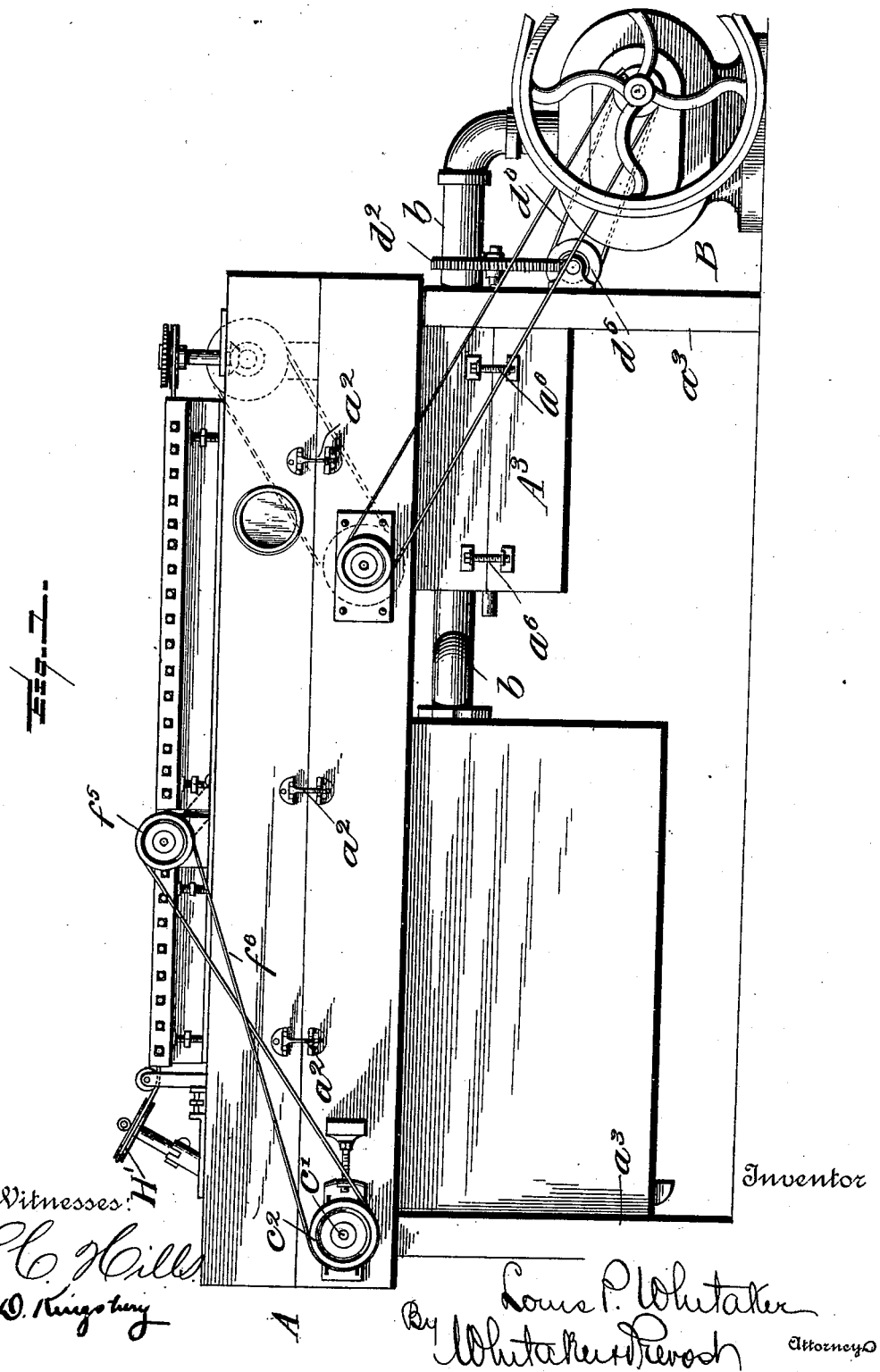

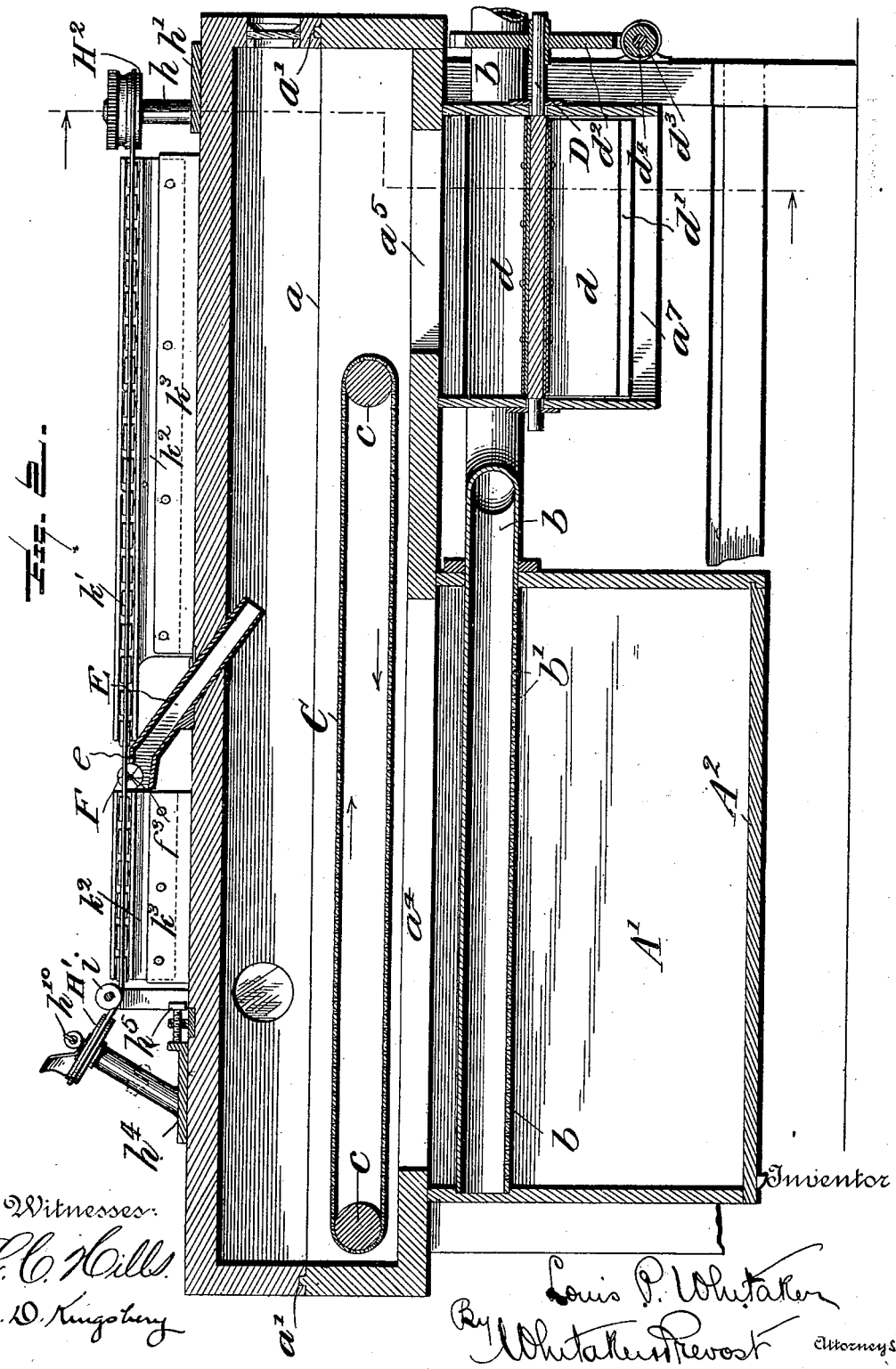

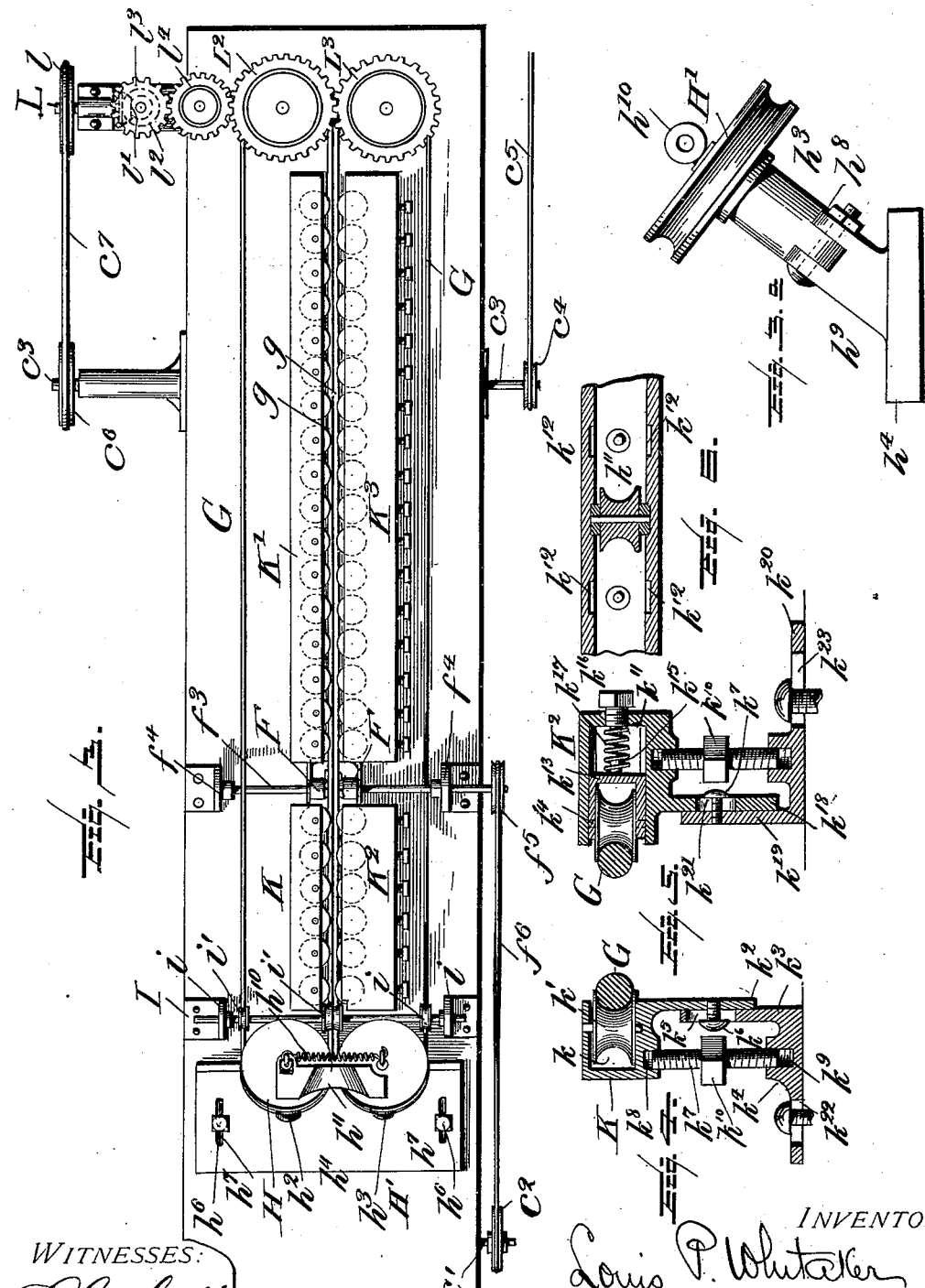

UNITED STATES PATENT OFFICE.

LOUIS P. WHITAKER, OF WASHINGTON, DISTRICT OF COLUMBIA, ASSIGNOR TO THE PNEUMATIC TOBACCO STEMMER COMPANY, OF SAME PLACE.

APPARATUS FOR SEPARATING FLEXIBLE PORTIONS OF LEAVES FROM THEIR STEMS.

SPECIFICATION forming part of Letters Patent No. 667,354, dated February 5, 1901.

Application filed January 26, 1900. Serial No. 2,889. (No model.)

*To all whom it may concern:*

Be it known that I, LOUIS P. WHITAKER, a citizen of the United States, residing at Washington, in the District of Columbia, have invented certain new and useful Improvements in Apparatus for Separating the Flexible Portions of Leaves from their Stems; and I do hereby declare the following to be a full, clear, and exact description of the invention, such as will enable others skilled in the art to which it appertains to make and use the same.

My invention is an improvement in apparatus for separating the flexible portions of leaves from their stems; and it consists in the novel features hereinafter described, reference being had to the accompanying drawings, which illustrate one form in which I have contemplated embodying my invention, and said invention is fully disclosed in the following description and claims.

Referring to the said drawings, Figure 1 represents a side elevation of my improved apparatus. Fig. 2 is a central vertical longitudinal section of the same, on a slightly-larger scale, without the air-exhausting device. Fig. 3 is a top plan view of the apparatus. Fig. 3$^a$ is a detail view of the movable belt-supporting pulley. Fig. 4 is a transverse vertical sectional view of one of the guides for the stem-carrying belt. Fig. 5 is a similar view of the opposite guide. Fig. 6 is a vertical sectional view of the guide shown in Fig. 5, taken longitudinally. Fig. 7 is a transverse vertical sectional view of the machine. Fig. 8 is a detail view, drawn to an enlarged scale, of the rotary knife.

The object of my invention is to provide apparatus for separating the lateral flexible portions of the leaves, particularly of the tobacco-plant, from their central stem, leaving the laterally-extending fibers of the leaf with the said lateral flexible portions.

In carrying out my invention the stem is placed in the grip of a suitable carrier and the leaf is subjected to the suction of a current of air, by means of which the lateral portions of the leaf are ripped or torn away from the central stem along lines close to and on opposite sides of the stem, the stem being drawn continuously forward by the said carrier, so as to subject the entire leaf from one end to the other to the action of the suction of the air-current. In my present invention the stem is preferably delivered to the carrier so that the carrier will grasp the extreme portion of the larger end or butt of the stem and will strip the leaf from the stem until it reaches a point where the stem is extremely narrow and delicate adjacent to the point of the leaf, where I prefer to have the stem severed or broken, so as to leave the tip portion of the stem with the remainder of the leaf. In the leaves of the tobacco-plant the laterally-growing fibers of the leaf are disposed at an angle to the central stem and extend from said stem in an inclined direction toward the pointed or tip end of the leaf. I have ascertained by experiment that while it is very easy to rip the leaf from the stem beginning at the point and running backward toward the butt, in which case the fibers easily tear away from the stem, when the stemming action commences at the butt and the lateral portions of the leaf are ripped from the butt toward the point of the leaf the lateral fibers do not so readily tear away from the stem, and I therefore provide an auxiliary device consisting in this instance of a rotary cutter to engage the fibers at their junction with the stem and nick, weaken, or partially or wholly sever the said fibers from the stem, so that the lateral portions of the leaf after separation from the stem shall be integral and shall contain the aforesaid lateral fibers.

In the accompanying drawings, A represents the main body of the machine, which consists of an air trunk or casing, preferably formed in two halves divided on a horizontal plane, (indicated at $a$, Figs. 1 and 2,) the two parts of the air trunk or casing having their meeting edges tongued and grooved, as indicated at $a'$, or otherwise arranged so as to form an air-tight joint, which may be provided with suitable packing, if necessary, the two sections of the air-trunk being secured together normally by detachable clamping devices, such as are shown at $a^2$. The lower section of the air-trunk is supported by suitable legs or standards $a^3$.

B represents an air-exhausting device, which in the present instance is what is known in the trade as the "Roots' positive air-exhauster," (shown in Fig. 1,) although any other form of air-exhausting device which will accomplish the desired result may be substituted therefor. This air-exhausting device is connected with the air-trunk in such a manner as to prevent the flexible portions of the leaves and also the sand, dirt, and fine particles of tobacco and foreign matter from being carried into the air-exhausting device. In the present instance I have shown the bottom of the lower section of the air-trunk provided with an elongated aperture $a^4$, which communicates with a sand-box A', secured to the under side of the air-trunk and provided with a bottom slide $A^2$, which can be drawn out to discharge the contents of the sand-box when necessary.

$b$ represents a pipe which is connected at one end to the air-exhausting device B and has a portion extending longitudinally of the sand-box A' and provided on its lower side with a series of fine apertures $b'$, by means of which the air enters the said pipe on its way to the exhauster B. The end of the pipe $b$ is closed in any suitable manner, in the present instance by being fitted into a socket in one of the end walls of the sand-box A'. It will be seen that any sand, grit, or other foreign matter passing from the air-trunk A into the sand-box A' will settle in the bottom of the sand-box and will not be drawn into the air-tube $b$. Within the air-trunk A is mounted a horizontal perforated belt or conveyer C, supported upon suitable rollers $c$, one of which is driven, as hereinafter described, when the machine is in operation. This belt or conveyer C is of the same width as the interior of the air-trunk and is disposed directly above the opening $a^4$ into the sand-box, so as to prevent the tobacco-leaves from passing into the said sand-box.

Adjacent to one end of the perforated conveyer-belt C the air-trunk A is provided with a discharge-aperture $a^5$, below which is a casing $A^3$, containing what I term the "dumping" or "discharging" apparatus. This casing is, for convenience in assembling the parts, made in two sections, like the air-trunk A, detachably connected together, as indicated at $a^6$ in Figs. 1 and 7. Within the casing $A^3$, I provide curved longitudinally-extending walls $A^4$ $A^4$, forming concentric segments of a cylinder, and between these walls is mounted a rotary shaft D, carrying a series of blades $d$, which are adapted to engage the said curved walls $A^4$ and form an air-tight connection therewith. The shaft D may be provided with any desired number of these blades, four being shown in the drawings, and said blades may be provided, if necessary, with strips of rubber, leather, or other suitable packing material $d'$ in order to secure an air-tight joint. Two or more of these blades will always be in engagement with opposite curved walls $A^4$, so that no air can enter the air-drum through the discharging apparatus, while it will be readily apparent that the tobacco falling upon the conveyer-belt C, which is driven in the direction indicated by the arrows in Fig. 2, will be delivered through the aperture $a^5$ into a space between two of the aforesaid blades $d$, and by turning the shaft D the material will be carried around and dropped through the bottom aperture $a^7$, with which the casing $A^3$ is provided, into a suitable receptacle $A^5$, located beneath the same. To this end the shaft D is in this instance shown as provided with a worm-wheel $d^2$, (see Figs. 1 and 2,) which is engaged by a worm $d^3$ on a transverse shaft $d^4$, provided with a driving-pulley $d^5$, which is connected by a belt $d^6$ in this instance with a pulley on the shaft of the air-exhauster B, so that continuous motion is imparted to the shaft D and its attached blades.

The upper section of the air-trunk is provided with an aperture fitted with a leaf-receiving tube E, preferably disposed in a horizontally-inclined position and having its upper end $e$ provided with a revolving cutter for weakening or severing the lateral fibers of the leaf, as before described, which cutter is illustrated in detail in Fig. 8. This cutter consists of two parts F F, having adjacent tapering portions provided with substantially perpendicular faces $f$, the outer edges of which form inclined cutting edges $f'$, the cutting edges of one part of the knife being staggered with those of the other part, as shown. $f^3$ represents the shaft of the rotary knife, to which the two parts of the knife are independently connected by set-screws $f^2$. The knife-shaft $f^3$ is mounted in bearings $f^4$, secured to the top of the air-trunk, and is provided with a pulley $f^5$, which receives motion from a belt $f^6$, which engages a driving-pulley $c^2$ on the shafts $c'$ of one of the rollers $c$, the belt $f^6$ being twisted, so as to give the required direction of motion to the knife. The other roller $c$ of the conveyer-belt C is provided with a shaft $c^3$, carrying a pulley $c^4$, which is driven by a belt $c^5$ from a pulley on the shaft of the air-exhausting device.

For the purpose of gripping the stems and carrying them over the suction of the air-current and the rotary cutter I employ a pair of endless carrier-belts having parallel portions lying closely adjacent to each other and preferably provided with guides for causing the parallel portions of the belt to firmly grip the stem between them and carry it along, the belts being so driven that the said adjacent parallel portions will travel in the same direction and at the same speed. In the drawings, G G represent the two carrier-belts, having their adjacent parallel portions indicated at $g$ $g$, the said belts each engaging a grooved pulley H or H' at the front end of the machine and a grooved pulley $H^2$ or $H^3$ at the rear end of the machine. The pulleys $H^3$ $H^2$ are mounted upon studs $h$, secured to a plate $h'$, which is rigidly attached to the body of the air-trunk. The forward pulleys H and H' are mounted upon inclined studs $h^2$ $h^3$, respectively, which are secured to an adjustable plate $h^4$, capable of being moved in a direction away from the pulleys $H^2 H^3$ by means of set-screws $h^5$ and adapted to be secured rigidly in position by means of clamping screws or bolts $h^6$, passing through slots $h^7 h^7$ in the plate $h^4$. The roller $H'$ at the front or feeding-in end of the machine is so mounted that it is capable of yielding slightly in a direction away from the opposite roller or pulley H, and to this end the stud $h^3$, upon which the pulley $H'$ is mounted, has a pivotal connection at $h^8$ (see Fig. $3^a$) with a base portion $h^9$, formed integrally with the plate $h^4$, so as to be capable of such lateral movement, and the pulley $H'$ is held normally in close relation to the pulley H by means of a spring $h^{10}$, interposed between the top of the stud $h^2$ and the top of the pivoted stud $h^3$. The upper end of the stud $h^2$ is provided with a guide $h^{11}$, which extends over the V-shaped space immediately in front of the meeting-points of the two belts for the purpose of guiding the butts of the stems into the bite of the carrier-belts, so that the end of the butt will not project to any extent above the carrier-belt. These front pulleys H and $H'$ are tilted up in the manner shown in order to facilitate the feeding of the leaves to the belts. With the pulleys in this position the leaves will be placed in a substantially horizontal position when the butts are inserted into the bite of the carrying-belts. In order to have the main portion of the belts travel in a horizontal or substantially horizontal plane, I provide a cross-shaft I adjacent to the lower edges of the front pulleys H $H'$ and in substantially the horizontal plane of the rear pulleys $H^2 H^3$, the said shaft being mounted in bearings $i$, secured to the frame of the machine, in this instance the top of the air-trunk, and being provided with rollers $i'$ or pulleys engaging the various portions of the two belts, so that the belts are brought into substantially horizontal positions between the shaft I and the rear pulleys $H^2 H^3$.

The belts will be tightened by adjusting the plate $h^4$ in the manner previously indicated, and the adjacent parallel portions $g g$ will exert a certain amount of pressure against each other, so as to grip any article inserted between them; but I prefer to provide guides on both sides of the path of the said parallel portions for the purpose of guiding them and also holding them in firm relation with each other, so that the stem cannot be disengaged from the belts at any point between the front and rear rollers or pulleys. I prefer to make the guide or guides on one side of the path of the said parallel portions stationary and those on the opposite side yielding, so that the belts may be allowed to separate slightly to accommodate stems of different thicknesses. It will be obvious, however, that the guides on both sides might be made with yielding parts if found desirable.

In the construction which I have illustrated in the accompanying drawings, K $K'$ indicate the stationary guide, which is conveniently made in two parts, the part K being located forward of the rotary knife F and the part $K'$ between said knife and the rear rollers. This guide is preferably formed as indicated in cross-section in Fig. 4, each part consisting of a horizontal bar K, (or $K'$,) which is planed out along the inner side to form the interior longitudinal recess $k$, in which are located a series of grooved rollers $k'$, placed very close together throughout the length of the guide and adapted to engage one of the belts G. The bar K (or $K'$) is preferably provided with a downwardly-extending flange $k^2$, which is secured adjustably to a vertical flange $k^3$, extending upwardly from a plate $k^4$, secured to the frame of the machine—in this instance the top of the air-trunk—in any suitable manner. The vertical flange $k^3$ is preferably provided at each end with a vertical slot $k^5$ to receive a screw $k^6$, which engages the vertical flange $k^2$ of the guide for the purpose of securing the guide rigidly in its adjusted position. For the purpose of enabling the guide to be accurately and quickly adjusted vertically I preferably provide each part thereof at each end with a vertically-disposed screw $k^7$, having its opposite ends oppositely threaded and engaging a threaded recess $k^8$ in the guide and a threaded recess $k^9$ in the plate $k^4$, and said screw is provided centrally with a suitable device for turning it, in this instance a squared portion $k^{10}$, all of which is clearly illustrated in Fig. 4, and the location of these adjusting-screws is also shown in Fig. 1. When it is desired to adjust either section of the guide vertically, the operator will loosen the screws $k^6$, adjust the guide by means of the oppositely-threaded screws $k^7$, and then tighten the screws $k^6$.

$K^2 K^3$ represent the sections of the opposite guide, which is provided with yielding or movable portions and which for convenience I term the "yielding" guide. A cross-section of this guide is illustrated in Fig. 5. It consists of a bar $K^2$, (or $K^3$,) having a recess $k^{11}$ extending longitudinally thereof and open on the inner face of the guide. At proper intervals the upper and lower walls of this recess are provided with transverse grooves $k^{12}$, in each pair of which is mounted a transversely sliding yoke $k^{13}$, carrying a friction grooved roller $k^{14}$, which engages one of the belts G at a point directly opposite the engagement of the other belt with one of the stationary rollers $k'$. Each yoke $k^{13}$ is provided with a spring $k^{17}$, which preferably engages a stud $k^{15}$ on the rear face of the yoke and a stud formed on a set-screw $k^{16}$, engaging a threaded aperture in the rear wall of the guide, as clearly shown in Fig. 5. It will be seen that springs $k^{17}$ will press the movable rollers toward the stationary rollers and hold the parallel portions of the belt in contact and will also yield to allow the stem to pass along with the belts.

Each section of the guides K² and K³ is provided with a downwardly-extending flange $k^{18}$, which is secured to a vertical flange $k^{19}$, extending upward from a plate $k^{20}$, by means of a screw $k^{21}$ passing through a slot in the flange $k^{18}$ and engaging the flange $k^{19}$. Each section of the yielding guide is also provided at each end with a double-threaded or oppositely-threaded screw $k^7$, engaging threaded recesses in the guide and in the plate $k^{20}$, as described with reference to Fig. 4.

In order to provide for the lateral adjustment of the guides, I prefer to provide the plates $k^4$ and $k^{20}$ with transversely-disposed slots $k^{22}$ and $k^{23}$, respectively, which are engaged by the screws or bolts which secure said plates to the frame of the machine, thus providing for the desired lateral adjustment of the guides supported by said plates.

In order to drive the belts G G, I provide the following mechanism: The rear pulleys H² H³ are provided with gears L² and L³, respectively, said gears intermeshing with each other. Each of these pulleys may be formed integrally with its gear or may be secured thereto in any desired way. L represents a horizontal driving-shaft provided with a pulley $l$ and a beveled pinion $l'$, which meshes with the beveled pinion $l^2$ on a vertical shaft L', provided at its upper end with a pinion $l^3$. This pinion $l^3$ meshes with an idle pinion $l^4$, mounted on a stud $l^5$ and engaging the gear L², thus transmitting motion to the gears L² L³ and their pulleys H² H³ and driving the belts G G, so that their adjacent parallel portions will move in the same direction and at the same rate of speed. The driving-shaft L may be operated in any suitable manner. In this instance I have shown it driven from the shaft $c^3$ of the rear conveyer-roller $c$, which shaft is provided with a pulley $c^6$, connected by a belt $c^7$ with the pulley $l$.

The operation of the device is as follows: The machine being in operation, the air-exhauster B will draw a strong current of air down through the suction-tube E into the air-trunk, through the perforated belt C and aperture $a^4$ into the sand-box A', and thence through the pipe $b$ to the exhauster, which current is continuous and causes a powerful suction at the upper end of the suction-tube E immediately beneath and forward of the rotary cutter. The carrier-belts G may be driven at any suitable speed. In practice I have found it advantageous to drive these belts at the rate of two hundred feet per minute; but they may be driven faster or slower, as found desirable. The operator will feed the leaves successively to the machine, placing the butt of each stem thereof in the bite of the belts between the forward rollers or pulleys H H'. Each leaf will be carried to the upper end of the suction-tube and over the top of the rotary knife F, which is driven in such a direction as to rotate against the movement of the stem. As the portions of the leaf are passed successively over the suction-tube and knife the suction of the air-blast will strip or tear the flexible portions of the leaf from the stem, and the rotary knife will assist this operation by weakening or cutting the lateral fibers of the leaf, the stem being carried on by the belts G G and delivered at the end of the machine by the separation of the belts as they pass around the rear pulleys H² H³, the flexible portions of the leaf passing down the suction-tube E with the air-current and being deposited upon the perforated belt C. The belt or conveyer C will carry the leaves toward the rear end of the machine and deposit them in the discharging apparatus, the operation of which has already been described. During the stemming operation the frictional engagement between the air-current and the leaf removes all sand, grit, and foreign matter therefrom, which foreign matter is carried with the air into the sand-box A', from which it may be discharged at suitable intervals.

In practice it is found that in stemming a leaf in the manner just described when the leaf has been separated from the stem, beginning at the butt and down to a point about two or three inches from the point of the leaf, where the stem is only about the same diameter as one of the lateral fibers of the leaf, the downward draw of the suction holding this reduced portion of the stem upon the rotary knife will sever the stem and leave the tip portion thereof with the rest of the leaf. The leaf therefore remains in one integral piece, the two lateral portions being united at the tip of the leaf.

What I claim, and desire to secure by Letters Patent, is—

1. In an apparatus for separating the lateral portions of leaves from their stems, the combination with a suction-tube, and an air-exhausting device operatively connected therewith, of a movable carrier having parts for gripping the stems, adapted to move in a path contiguous to the suction-tube and a device located adjacent to the path of the carrier and adjacent to the suction-tube for weakening or severing the lateral fibers of the leaves, substantially as described.

2. In an apparatus for separating the lateral portions of leaves from their stems, the combination with a suction-tube, and an air-exhausting device operatively connected therewith, of a movable carrier provided with gripping portions arranged to move in a path contiguous to the suction-tube and a rotary knife located adjacent to the inlet end of said tube and adjacent to the path of said carrier, substantially as described.

3. In an apparatus for separating the lateral portions of leaves from their stems, the combination with a suction-tube, of a rotary knife located adjacent to the inlet end of said tube and means for gripping and feeding forward the stems, located adjacent to the inlet end of said tube and said knife, substantially as described.

4. In an apparatus for separating the lateral portions of leaves from their stems, the combination with a suction-tube, of a device located adjacent to the inlet end thereof for weakening or severing the lateral fibers of the leaves and devices for gripping and carrying forward the stems, substantially as described.

5. In an apparatus for separating the lateral portions of leaves from their stems, the combination with a suction-tube, of a carrier comprising a pair of endless belts having parallel contiguous portions adapted to grip the stems between them, said parallel portions having their path of travel adjacent to the inlet end of said tube and means for driving said belts to cause said contiguous parallel portions thereof to move in the same direction and at the same rate of speed, substantially as described.

6. In an apparatus for separating the lateral portions of leaves from their stems, the combination with a suction-tube, of a carrier comprising two endless belts having parallel contiguous portions adapted to grip the stem between them and carry it across the inlet end of said tube, guides arranged on opposite sides of said parallel contiguous portions of said belts, and means for driving said parallel portions of said belts in the same direction and at the same rate of speed, substantially as described.

7. In an apparatus for separating the lateral portions of leaves from their stems, the combination with a suction-tube, of a carrier comprising two endless belts having parallel contiguous portions adapted to grip a stem between them and carry it across the inlet end of said tube, longitudinally-disposed guides on opposite sides of the parallel contiguous portions of said belts, the guides on one side of said parallel portion being provided with yielding belt-engaging portions and means for driving said belts to cause the contiguous portions thereof to travel in the same direction and at the same rate of speed, substantially as described.

8. In an apparatus for separating the lateral portions of leaves from their stems, the combination with a suction-tube, of a device located adjacent to the inlet end thereof, for weakening the lateral fibers of the leaves and a carrier comprising two endless belts having parallel contiguous portions extending over said device and the inlet end of said tube and means for driving said belts to cause the said contiguous portions thereof to travel in the same direction and at the same rate of speed, substantially as described.

9. In an apparatus for separating the lateral portions of leaves from their stems, the combination with a suction-tube, of a carrier comprising two endless belts having parallel contiguous portions extending over the inlet end of said tube, longitudinally-disposed guides located on opposite sides of said contiguous portions of said belts, the guides on one side of said contiguous portion being provided with yieldingly-mounted belt-engaging rollers, and means for driving said belt to cause said contiguous portions to travel in the same direction and at the same speed, substantially as described.

10. In an apparatus for separating the lateral portions of leaves from their stems, the combination with an air-trunk, a suction-tube communicating therewith, an air-exhausting device operatively connected with the air-trunk, a discharging-casing connected with said air-trunk, a revolving dumping device in said casing provided with a series of radial blades and a conveyer interposed between said suction-tube and said discharging-casing, substantially as described.

11. In an apparatus for separating the lateral portions of leaves from their stems, the combination with an air-trunk, a suction-tube communicating therewith, a sand-box communicating with said trunk, a discharging-casing communicating with said trunk, a revoluble discharging device provided with radial blades located in said casing, an air-exhausting device communicating with said sand-box and a perforated conveyer interposed between said suction-tube and said sand-box and having its discharge end adjacent to the discharging-casing, substantially as described.

12. In an apparatus for separating the lateral portions of leaves from their stems, the combination with an air-trunk, of a suction-tube communicating therewith, a rotary knife adjacent to the inlet end of said tube, a carrier comprising two endless belts having parallel contiguous portions extending over said knife and the inlet end of said tube, an air-exhausting device operatively connected with said air-trunk, a discharging apparatus for said air-trunk and means for driving said belts to cause the contiguous portions thereof to move in the same direction and at the same speed, substantially as described.

13. In an apparatus for separating the lateral portions of leaves from their stems, the combination with a suction-tube, of a carrier comprising two endless belts having contiguous parallel portions, end supporting-rollers engaging said belts, the supporting-rollers at one end of said carrier being disposed at an angle to the plane of the contiguous portions of said belts to facilitate the insertion of the stems between said belts and means for driving said belts to cause the contiguous parallel portions to move in the same direction and at the same speed, substantially as described.

14. In an apparatus for separating the lateral portions of leaves from their stems, the combination with a suction-tube, of a rotary knife located adjacent to the inlet end thereof and provided with oppositely-inclined cutting edges substantially as described.

15. In an apparatus for separating the lateral portions of leaves from their stems, the combination with a suction-tube, of a rotary knife rotated adjacent to the inlet end thereof and provided with oppositely-inclined cutting edges and a movable carrier provided with stem-gripping portions traveling in a path adjacent to said knife and the inlet end of said tube, substantially as described.

16. In an apparatus for separating the lateral portions of leaves from their stems, the combination with a suction-tube, of a carrier comprising two endless belts having parallel contiguous portions extending over the inlet end of said tube, stationary guides located upon one side of said contiguous portions and provided with a series of belt-engaging rollers, guides located on the opposite sides of said contiguous portions and provided with a series of transversely-yielding belt-engaging rollers and devices for laterally and vertically adjusting said guides, substantially as described.

In testimony whereof I affix my signature in the presence of two witnesses.

LOUIS P. WHITAKER.

Witnesses:
J. D. KINGSBERY,
B. W. BROCKETT.